3,445,627
METHOD OF CONVEYING VERY LARGE HEAT CONVECTION TO BOILING LIQUIDS
Karl Stephan, Krefeld, Germany, assignor to Mannesmann Aktiengesellschaft, a corporation of Germany
Filed July 1, 1966, Ser. No. 562,399
Claims priority, application Germany, July 2, 1965, M 65,775
Int. Cl. F22b 1/28
U.S. Cl. 219—271                    10 Claims

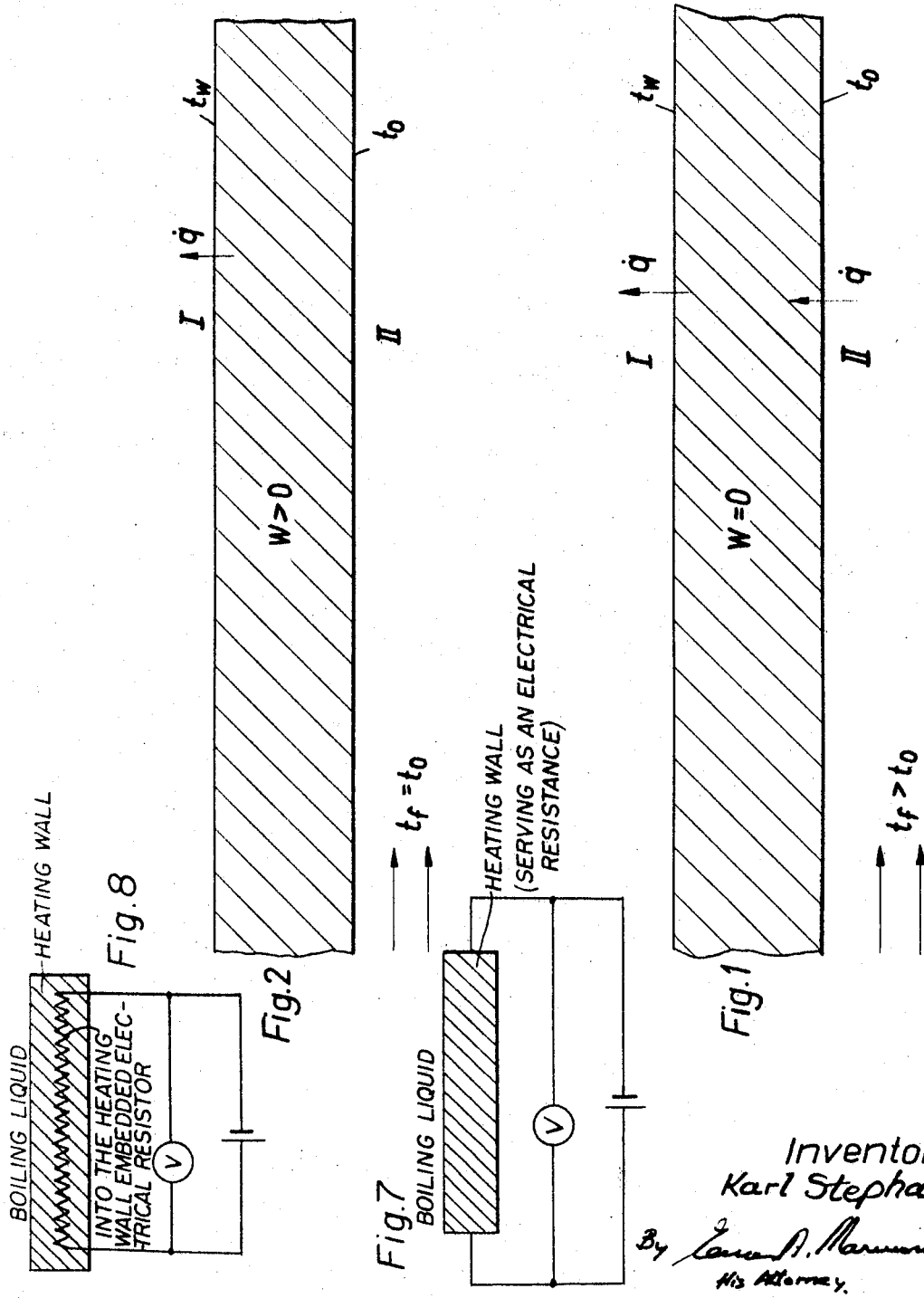

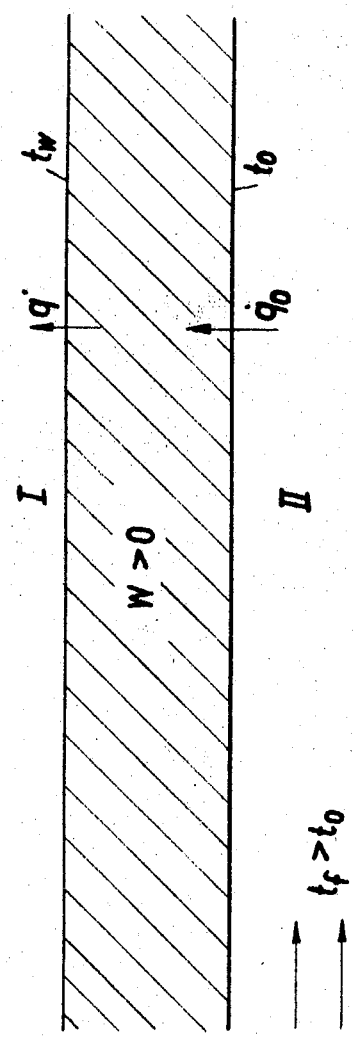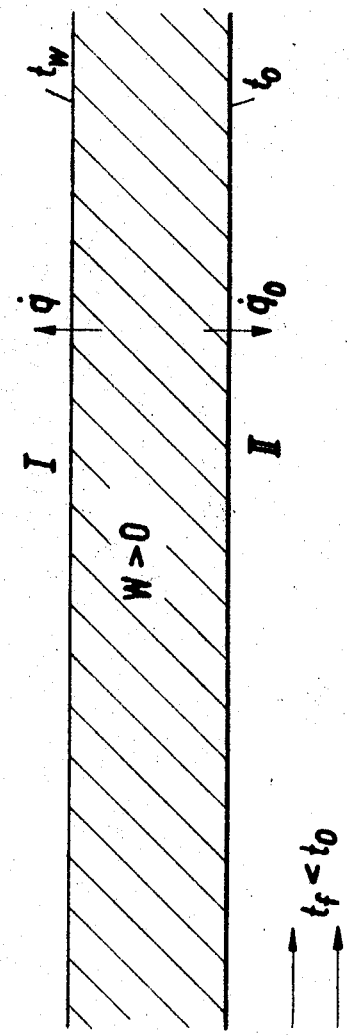

ABSTRACT OF THE DISCLOSURE

A method of conveying very large heat convection to boiling liquids free from film evaporation, provides for conveying a secondary liquid along the heating wall, thereby stabilizing the boiling operation and restraining the sudden change of bubbles into film evaporation.

---

The invention relates to a process to transmit heat to boiling liquids whereby the heat flux density, namely, heat related to the time unit and to the unit of the heating surface, is as great as possible. It is known that boiling liquids are highly suitable for transmission of extremely great heat flux densities at slight differences in temperatures. Thereby, three different areas of heat transmission can be distinguished: namely, the area of bubble-evaporation, the area of partial film-evaporation, and the area of total film-evaporation. Between the bubble-evaporation and the partial film-evaporation there exists a maximum of heat flux density, ranging from 1000 to 6000 kw. per square meter of heating surface. The transmission of these heat flux densities is, however, extremely difficult.

With electric energy input, or with energy input achieved by nuclear fission, slight deviations from the high heat flux densities may cause a sudden rise of temperature in the heating surface. This temperature rise may be so great that the heating surface starts to melt.

With evaporators heated by a liquid or by gas, melting of the heating surface will generally not occur, yet slight deviations from the high maximum values may cause the transmitted heat flux density to drop suddenly to a fraction of the maximum values.

The phenomena described can be prevented if heat exchangers operating on boiling liquids are designed following the rule to remain sufficiently below the limit value of the heat flux density.

The heating surface of the conventional evaporators could be reduced to approximately one-tenth, if the evaporator were operated at a maximum heat flux density. With nuclear reactors operating with boiling liquids, the heating surface could be reduced to approximately one-half. For economic reasons, however, it is desirable to bring the operational point as close as posisble to the attainable maximum of the heat flux density, so that the conveying or transmission of a highest possible heat flow will require the smallest possible heating surface.

A plotting of the heat flux density taken up by the boiling liquid depending on the difference between the temperature of the heating surface and the boiling temperature of the liquid, will bring about the so-called characteristic boiling curve of the liquid. This is a curve with an ascending branch (the area of bubble-evaporation), an adjoining descending branch (area of partial film-evaporation), and a second ascending branch (area of total film-evaporation). On the same diagram, a resistance characteristic can be entered for the heat flux density given off by the wall, and this resistance characteristic can, in good approximation, be shown as a straight line (the so-called linear resistance of the evaporator).

Analog to the pumping operation, whereby the operating points turn out to be intersecting points between a delivery characteristic of the pump and a resistance characteristic of the pipeline, the operating points of the evaporator are represented here, too, as intersecting points of the aforementioned characteristic boiling curve with the linear resistance of the evaporator. These two characteristic curves may have one, two, or three common points. Theoretical consideration and experiments have shown that a condition characterized by these intersecting points can only then be considered stable, if the characteristic boiling curve at the point in question has a greater ascent than the linear resistance. This practically means that the operational points on the ascending branches of the characteristic boiling curve characterize stable conditions. If an evaporator operates near the maximum of the heat flux density, then the operational points come closer together on the ascending and descending branches of the characteristic boiling curve. In consequence thereof, slight disturbances may transfer an operational point on the ascending branch to the descending branch of the characteristic boiling curve; as it characterizes a stable condition, the operational point of the evaporator cannot be maintained in the proximity of the maximum. This phenomenon can be prevented by taking care that the linear resistance is as steep an inclination as possible.

It is accordingly among the principal objects of the invention to provide for the transmission of especially great flows of heat to boiling liquids with heating surfaces of predetermined size, by steps which make it possible to increase the heat supply to such an extent that the operational point resulting from the characteristic boiling curve of the liquid, and from the resistance characteristic of the evaporator will occur as close as possible near the attainable relative maximum of the heat flux density; and to provide for the generating of the flow of a fluid, which stabilizes the evaporating process, along the other surface of the wall of the evaporator, thus on the other side of the surface, on which the liquid evaporates. The latter makes it possible that the linear resistance of the wall of the evaporator takes a steeper course of inclination.

It is another object of the invention to provide that, in spite of the stabilizing flow of fluid, the linear resistance characteristic, due to the maximum of the heat flux density, intersect the descending branch of the characteristic boiling curve in the immediate proximity of the maximum, an operational point be selected that is disposed outside the maximum, the temperature of which is lower than the temperature inside the maximum. This reduces the danger that in case of a slight disturbance in the operational point the evaporator is transferred onto the unstable condition existing on the descending branch of the characteristic boiling curve.

It is a further object of the invention to provide that the aforesaid flowing fluid can furnish the energy necessary for the evaporation. Yet this energy can also be generated solely in the wall in such a manner that the wall serves as electrical resistance heater, or that the energy is generated in the wall by nuclear fission; another possibility is the generation of energy necessary for evaporation partly by the flowing fluid and partly by occurring in the wall.

It is yet another object of the invention to provide for the modification of the properties of the characteristic of the boiling curve. Experiments have shown that this can be achieved for instance by roughening the heating surface. Thereby, the characteristic boiling curve is shifted towards lower temperatures; furthermore, its ascent in the area between the relative maximum and the relative minimum is reduced (that means, the curve becomes more flattened). This measure makes it possible to displace—at an unchanged heat resistance of the evaporator—the unstable intersecting point of the descending branch of the characteristic boiling curve further to the right, or even to avoid it.

It is yet a further object of the invention to provide for the modification of the evaporator's heat resistance in such a manner that the linear resistance proceeds in a steeper course of inclination, which is achieved by measures that increase the heat transmission from the stabilizing fluid to the boiling liquid. This can for example be attained by reducing the heat transmission resistance between the fluid and the adjoining wall, caused by a turbulence-promoting wall surface and/or by reducing the thermal conductivity resistance within the wall by means of a smaller wall thickness and the selection of suitable materials.

For a fuller understanding of the nature and objects of the invention, reference should be had to the following detailed description, taken in connection with the accompanying drawings, in which:

FIGS. 1–4 are sectional views, each showing a wall of an evaporator with a boiling liquid on one side and a stabilizing fluid flowing on the other side;

FIG. 7 is a schematic wiring diagram showing an embodiment; and

FIG. 8 is a schematic diagram similar to FIG. 7 but showing a modification.

In the example of an embodiment shown in FIG. 1, the heat flux density $q'$ transmitted to the boiling liquid I, is furnished solely by the stabilizing fluid II. This requires that the temperature $t_f$ of the stabilizing fluid II be higher than the temperature of the adjoining wall. No energy is generated in the wall itself ($W=0$). A temperature gradient $t_0-t_w$ is present in the wall.

In the modification shown in FIG. 2, the heat flux density $q$ transmitted to the boiling liquid I, is generated solely in the wall ($W>0$). The temperature $t_f$ of the stabilizing fluid II is equal to the temperature $t_0$ of the adjoining wall. A temperature gradient of $t_w-t_0$ is present in the wall.

In the modification shown in FIG. 3, the heat flux density, given off to the boiling liquid I, is composed of one part $q_0$ from the stabilizing fluid II, and of one part from energy ($W>0$) produced in the wall. The temperature $t_f$ of the stabilizing fluid II is higher than the temperature $t_0$ of the adjoining wall. A temperature gradient $t_w-t_0$ is present in the wall.

In the modified embodiment shown in FIG. 4, the energy ($W>0$) produced in the wall is given off partly to the boiling liquid I, and partly to the flowing fluid II. The heat flux density, transmitted to the flowing fluid, is $q_0$. The temperature $t_f$ of the fluid is lower than the temperature $t_0$ of the adjoining wall. A temperature gradient $t_w-t_0$ is present in the wall.

The effect of the flowing fluid by stable operation of the evaporator can be explained as follows:

If the wall temperature $t_w$ increases, for example due to fluctuation of the heat flux density, then the difference $t_f-t_w$ between the wall temperature and the liquid temperature $t_f$ is reduced. As a result thereof, the fluid II supplies less heat, whereupon the wall temperature $t_w$ drops again. In reverse, when the wall temperature drops, the difference in temperature $t_f-t_w$ rises, which causes the wall temperature to rise again.

This consideration is valid regardless of the value of the temperature $t_0$ of the heating surface on the side of the fluid II.

Therefore, the temperature, especially at the operating point of the evaporator, can be $t_0=t_f$. In such a case, the energy produced in the wall serves only for the evaporation of the liquid. Nonetheless, the fluid II has a stabilizing effect: At a slight increase of the wall temperature $t_w$, there will also increase the temperature $t_0$ on the side of the fluid II. In consequence thereof, heat can now be transferred to the fluid II so that the wall temperature in turn drops again. The reverse takes place if the wall temperature $t_w$ drops.

Figure 5:
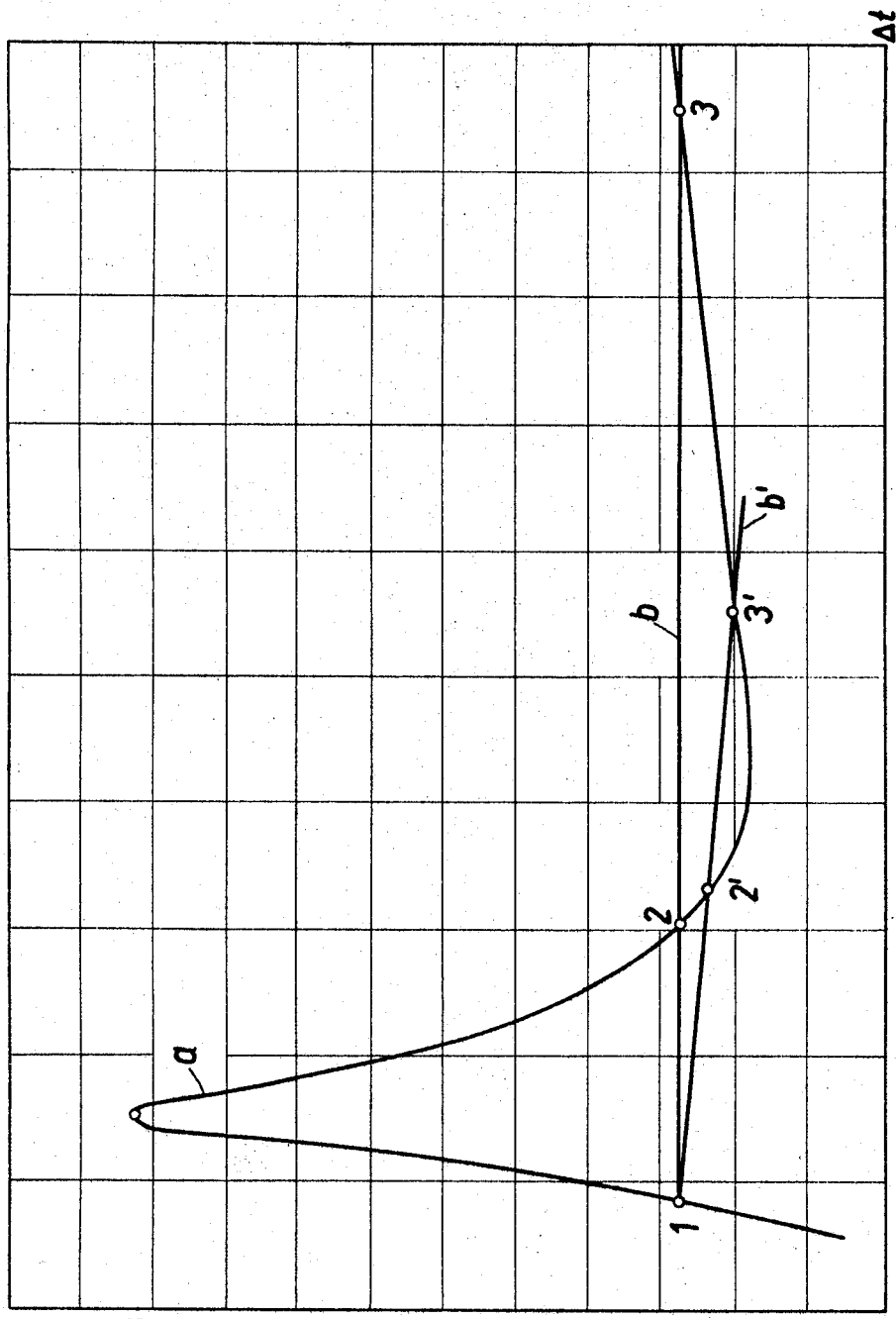
FIG. 5 is a graph that shows the characteristic boiling curve of a liquid, and two different resistance characteristics of conventional evaporators.

In FIG. 5, the curve $a$ shows the relation between the heat flux density taken up by the boiling liquid, and the difference between the wall temperature $t_w$ and the boiling temperature $t_s$. The curve $b$ is the linear resistance of the evaporator in the case where the energy transmitted to the boiling liquid is produced only in the wall and that a stabilizing fluid is not present. With the characteristic boiling curve $a$, three intersecting points are brought about (points 1, 2, 3), which represent possible operational points. The greater the produced energy is, the more the linear resistance is shifted towards higher heat flux densities. If it proceeds through the maximum of the heat flux density, it will have left—after a slight increase of the heat flux density—only one intersecting point with the right ascending branch of the characteristic boiling curve. The pertinent operational temperature is then generally so high that the heating surface begins to melt. In the literature this phenomenon is called "burnout."

The linear resistance curve $b'$ is an example of an evaporator of the conventional type, that means the energy transmitted by the boiling liquid is furnished by a flowing fluid. The curve $b'$ in the drawing has also three intersecting points (1, 2', 3'). There is, in both cases, a considerable distance between the operational point 1 and the relative maximum of the characteristic boiling curve $a$.

Figure 6:
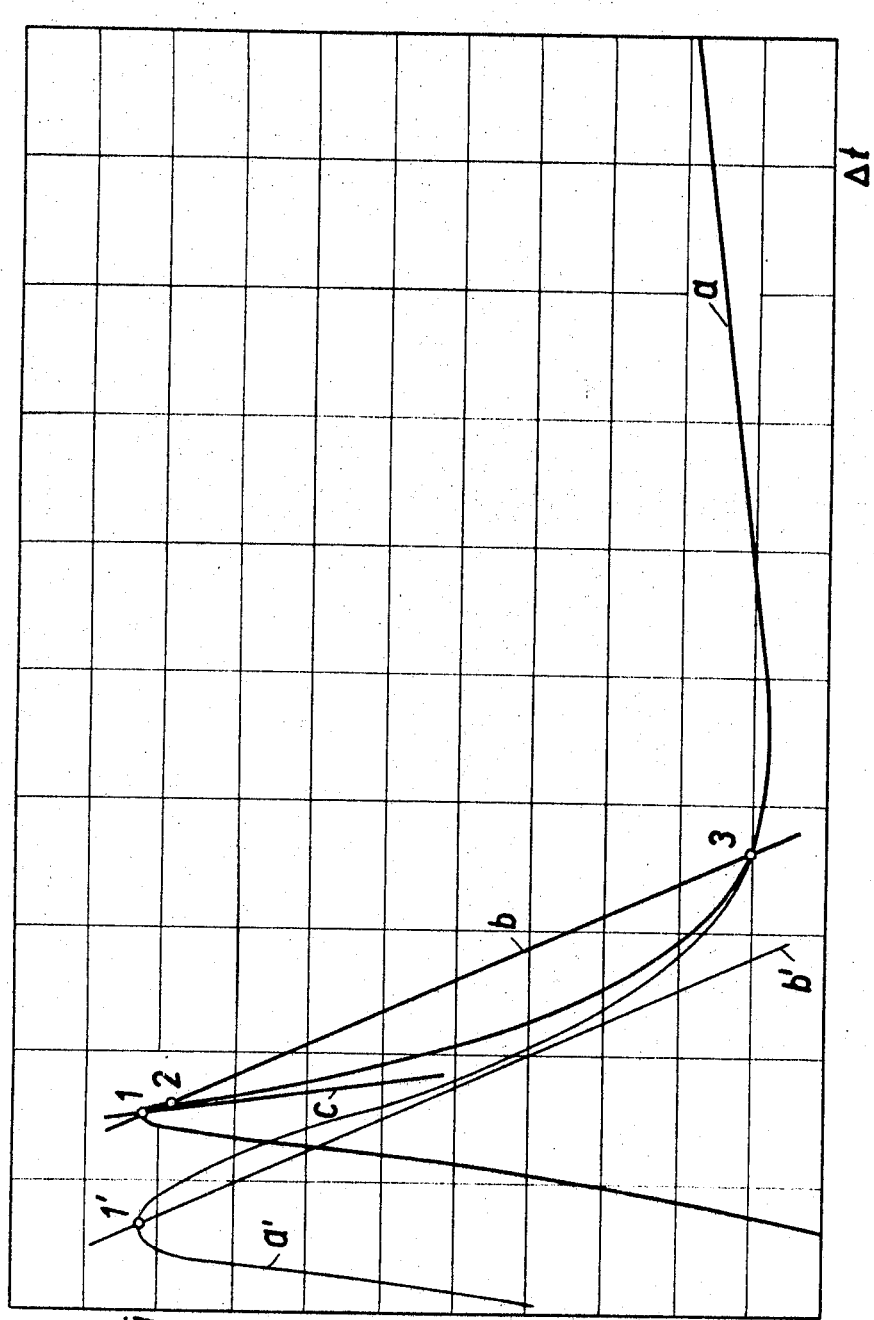
FIG. 6 is a graph that shows the characteristic boiling curve of a liquid with resistance characteristics through the maximum of the heat flux density; as well as a characteristic boiling curve (at roughened heating surface), displaced farther to the left, which shows also a linear resistance of the evaporator through the maximum of the heat flux density.

In FIG. 6, the characteristic boiling curve $a$ is intersected by a straight resistance line $b$, which proceeds through the maximum 1 of the heat flux density. At this inclination or slope of the straight resistance line, the points 1 and 2 lie close together. A slight disturbance would suffice to transfer the condition of the evaporator from point 1 to point 2. Since point 2 characterizes an unstable condition, a new stable operational condition would occur only at point 3, which signifies a leaping drop of the heat flux density from point 1 to point 3. This can be prevented by a course of the straight resistance line as steep as for instance the curve $c$ in the drawing, which intersects the characteristic boiling curve only at point 1.

By roughening the heating surface one obtains the characteristic boiling curve $a'$. The straight resistance line $b'$ drawn through the maximum 1 of the curve $a'$, proceeds parallel to the straight resistance line $b$ yet has, besides the intersecting point in the maximum 1', no further intersecting points with the characteristic boiling curve $a'$; this is due to the fact that the latter proceeds in a flatter manner within the area of the partial film-evaporation than the curve $a$.

The question whether one should select the operating point I of the evaporator in the relative maximum of the heat flux density, or should displace it towards a lower wall temperature, can only be decided by a consideration of costs. If the costs for the heating surface are high, for example due to the fact that the heating surface itself is large, and because its manufacture and the materials used are expensive, then the costs for the pump circulation of the stabilizing fluid will be comparatively low. In such a case, a very steep characteristic evaporator line will need to be materialized, and the operating point will need to be placed as near as possible to the maximum in order to save heating surface space.

If, on the other hand, the costs for the heating surface are low, for instance due to the fact that the heating surface itself is small, and because its manufacture and the materials used are cheap then, in contrast, the costs for the pump circulation of the stabilizing fluid may be high as compared with costs for the heating surface. In that case, one can save pump circulation costs and thus can do without a very steep characteristic evaporation line. In such case it is recommended to select an operating point on the left side of the relative maximum of the heat flux density.

In FIG. 7 the heating wall itself serves as an electrical resistance, while in FIG. 8 an electrical resistor is shown embedded into the heating wall.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a method of conveying very large flows of heat to boiling liquids by means of an evaporator including a wall having a heating surface of predetermined size, the steps comprising utilizing an extensive amount of heat sufficiently large so that the operational point resulting from an intersection of the characteristic boiling curve of the liquid and the resistance characteristic of the evaporator will occur as closely as possible to the attainable relative maximum of the heat flux density constituting the heat stream which is transmitted to the boiling liquid per unit of said heating surface, and guiding a fluid flowing alongside a surface of the evaporator wall that is disposed opposite the heating surface at which the liquid evaporates for stabilizing said evaporation, whereby there is attained a most steep inclination of the linear resistance characteristics of said evaporator wall.

2. In a method according to claim 1, said operational point having a temperature which is lower than that in the relative maximum of the heat flux density.

3. In a method according to claim 1, characterized by measures by which the ascent of the characteristic boiling curve of the liquid is reduced within the area between the relative maximum and the relative minimum, whereby the curve proceeds more flatly.

4. In a method according to claim 1, characterized by measures, through which the heat transmission from the stabilizing fluid to the boiling liquid is increased, by reducing the heat transmission resistance, caused by a turbulence-promoting wall surface, and by reduction of the heat conductivity resistance in the wall due to a low thickness of the wall and suitable working materials.

5. In a method according to claim 1, the stabilizing fluid alone furnishing the energy necessary for the evaporation of the liquid.

6. In a method according to claim 1, the energy required for the evaporation of the liquid in its stationary condition being produced in the evaporator wall alone.

7. In a method according to claim 1, the energy necessary for the evaporating being partly furnished by the flowing fluid and partly being produced in the wall.

8. In a method according to claim 7, the wall itself being used as an electric resistance.

9. In a method according to claim 7, the electric energy being transmitted to a resistance embedded in the wall of the evaporator.

10. In a method, as claimed in claim 3, the step of using a roughened heating surface.

References Cited

UNITED STATES PATENTS

| | | | |
|---|---|---|---|
| 3,056,587 | 10/1962 | Steigerwald | 165—1 |
| 3,370,644 | 2/1968 | Daily et al. | 165—1 |

FOREIGN PATENTS

| | | |
|---|---|---|
| 1,145,183 | 10/1963 | Germany. |

ANTHONY BARTIS, *Primary Examiner.*

C. L. ALBRITTON, *Assistant Examiner.*

U.S. Cl. X.R.

122—32; 165—1